(12) United States Patent
Chu et al.

(10) Patent No.: US 10,087,827 B2
(45) Date of Patent: Oct. 2, 2018

(54) VALVE DEVICE FOR VEHICLE

(71) Applicants: Hyundai Motor Company, Seoul (KR); Kia Motors Corp., Seoul (KR)

(72) Inventors: Dong Ho Chu, Ansan-si (KR); Yang Geol Lee, Hwaseong-si (KR); Woo Young Choi, Seoul (KR); Jeong Kyu Lim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 92 days.

(21) Appl. No.: 15/286,406

(22) Filed: Oct. 5, 2016

(65) Prior Publication Data

US 2017/0328270 A1    Nov. 16, 2017

(30) Foreign Application Priority Data

May 12, 2016   (KR) .......................... 10-2016-0058300

(51) Int. Cl.

| F02B 37/18  | (2006.01) |
| F16K 31/42  | (2006.01) |
| F02B 37/16  | (2006.01) |
| F16K 31/122 | (2006.01) |
| F16K 31/40  | (2006.01) |

(52) U.S. Cl.
CPC ............ *F02B 37/186* (2013.01); *F02B 37/16* (2013.01); *F16K 31/122* (2013.01); *F16K 31/406* (2013.01); *F16K 31/42* (2013.01); *Y02T 10/144* (2013.01)

(58) Field of Classification Search
CPC ........ F02B 37/186; F02B 37/16; F16K 31/42; F16K 31/406; F16K 31/122; Y02T 10/144

USPC .................................... 60/600, 605.1, 605.2
See application file for complete search history.

(56) References Cited

U.S. PATENT DOCUMENTS

| 2,915,045 | A  | * | 12/1959 | MacKenzie |
| 2,918,042 | A  | * | 12/1959 | Jensen |
| 3,460,439 | A  | * | 4/1969  | Cripe |
| 5,957,151 | A  | * | 9/1999  | Dalcourt |
| 6,805,121 | B1 | * | 10/2004 | Flood et al. |
| 2001/0029935 | A1 | * | 10/2001 | Cook |
| 2015/0308390 | A1 |   | 10/2015 | Jin |

FOREIGN PATENT DOCUMENTS

| JP | 11-270416 A       | 10/1999 |
| KR | 20-1993-0020036 U | 9/1993  |
| KR | 10-1999-0053624 A | 7/1999  |
| KR | 10-2006-0058338 A | 5/2006  |
| KR | 10-2012-0092776 A | 8/2012  |
| KR | 10-2013-0108791 A | 10/2013 |

* cited by examiner

*Primary Examiner* — Hoang Nguyen
(74) *Attorney, Agent, or Firm* — Morgan, Lewis & Bockius LLP

(57) ABSTRACT

A valve device for a vehicle may include a pneumatic valve having first and second chambers in which respective pressures thereof are regulated, and a pressure regulation valve coupled to the pneumatic valve, the pressure regulation valve communicating with the first chamber, including a positive pressure side opening and a negative pressure side opening, and selectively opening and closing the positive pressure side opening and the negative pressure side opening to regulate the pressure in the first chamber.

4 Claims, 4 Drawing Sheets

VALVE DEVICE FOR VEHICLE

CROSS REFERENCE TO RELATED APPLICATION

The present application claims priority to Korean Patent Application No. 10-2016-0058300, filed May 12, 2016, the entire contents of which is incorporated herein for all purposes by this reference.

BACKGROUND OF THE INVENTION

Field of the Invention

The present invention relates to a valve device for a vehicle, and, more particularly, to a valve device for a vehicle, capable of improving valve response using a negative pressure.

Description of Related Art

A variety of fluids such as air and fuel flow in a vehicle, various types of valves are provided to intermit the flow of the fluids. Among these valves, a pneumatic valve is operated using the pneumatic pressure formed in a pneumatic chamber.

Specifically, the valve is provided such that, when the pneumatic chamber is partitioned into a plurality of spaces a negative pressure is formed in any one of the spaces, the valve is operated by a difference in pressure. In this case, a negative pressure line and a positive pressure line are provided to regulate the pressure formed in the pneumatic chamber, a separate valve may be provided to interrupt the communication between the negative pressure line and the pneumatic chamber.

However, since the operability and response of the valve may be improved as a time for filling the pneumatic chamber with positive or negative pressure may be shortened, it is necessary to improve the valve.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a valve device for a vehicle, capable of easily and effectively improving valve response and space utilization.

According to various aspects of the present invention, a valve device for a vehicle may include a pneumatic valve having first and second chambers in which respective pressures thereof are regulated, and a pressure regulation valve coupled to the pneumatic valve, the pressure regulation valve communicating with the first chamber, including a positive pressure side opening and a negative pressure side opening, and selectively opening and closing the positive pressure side opening and the negative pressure side opening to regulate the pressure in the first chamber.

The pneumatic valve may be mounted on a bypass passage in which intake air is configured to be bypassed from a downstream side of a turbocharger to an upstream side of the turbocharger, to control flow of the intake air.

The pressure regulation valve may be a solenoid valve having an armature, the negative pressure side opening may be formed on a first end of a movement path of the armature, and the positive pressure side opening may be formed on a second end of the movement path of the armature, to open one of the negative pressure side opening and the positive pressure side opening to communicate with the first chamber, when another of the negative pressure side opening and the positive pressure side opening is closed according to movement of the armature.

The pressure regulation valve may be detachably coupled to the pneumatic valve.

The pneumatic valve may include a plurality of insertion grooves circumferentially arranged on an outer periphery thereof, and the pressure regulation valve may include a plurality of insertion protrusions formed at positions corresponding to the insertion grooves, so that the pressure regulation valve may be mounted to the pneumatic valve in a state in which the pressure regulation valve is rotated relative to the pneumatic valve.

As apparent from the above description, in accordance with the valve device for a vehicle of various embodiments of the present invention, it is possible to easily and effectively improve valve response and space utilization.

Particularly, since the pressure regulation valve is coupled to the first chamber of the pneumatic valve having the first and second chambers to adjust the opening and closing of the positive pressure side opening and the negative pressure side opening, it is possible to effectively reduce a time required to form negative and positive pressures in the first chamber.

In addition, since the pneumatic valve is provided on the bypass line of the intake passage on which the turbocharger is mounted, it is advantageous to rapidly bypass supercharged air which may flow backward through the turbocharger when the tip-out occurs.

Meanwhile, the pressure regulation valve is coupled to the pneumatic valve in the state in which it is rotated relative to the pneumatic valve. Thus, it is advantageous in terms of space utilization since the hoses may be changed in a direction required for the layout.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
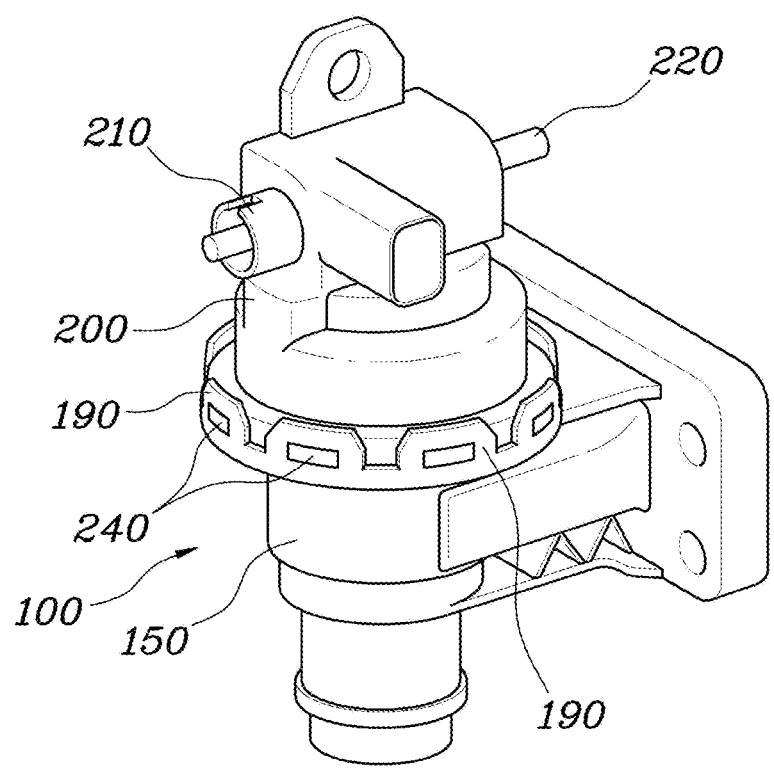
FIG. 2 is a perspective view illustrating the valve device for a vehicle according to various embodiments of the present invention.
Figure 3:
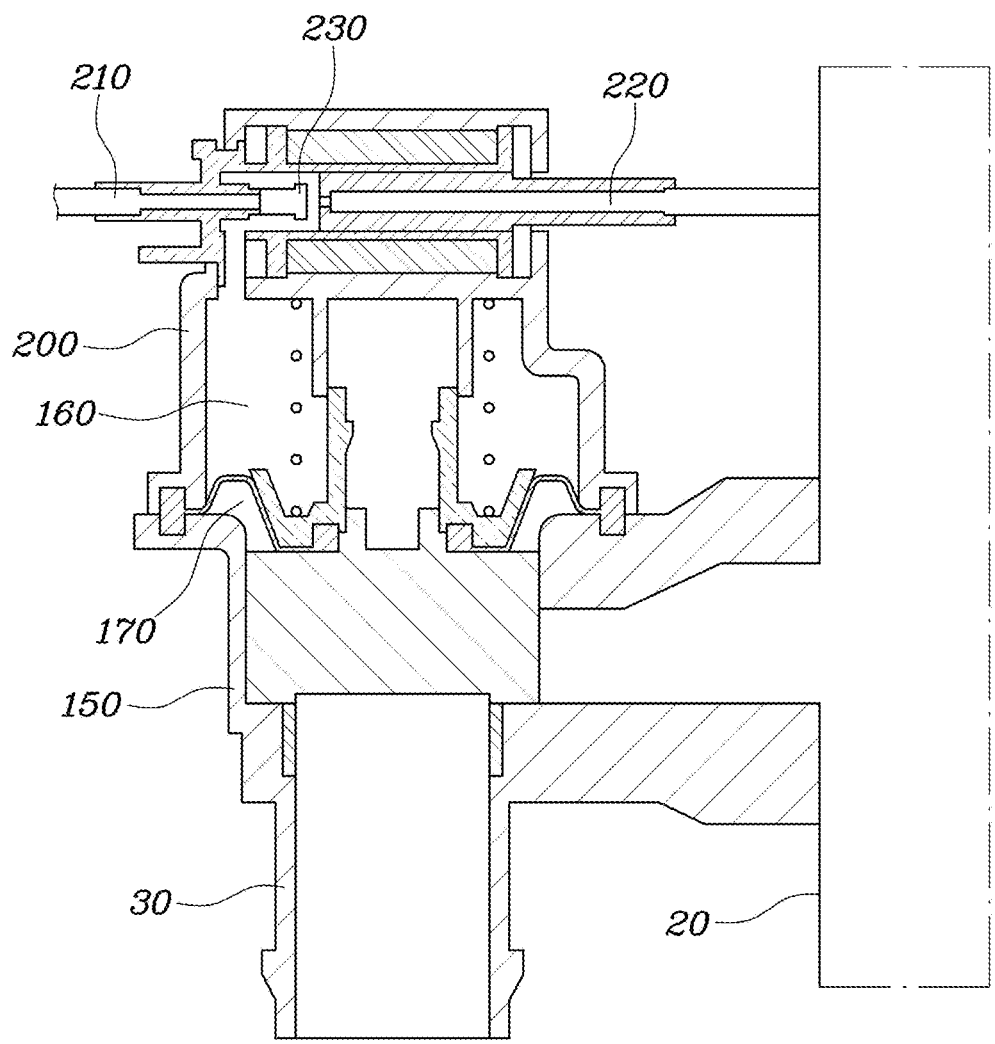
FIG. 3 is a view illustrating a state in which the valve device for a vehicle according to various embodiments of the present invention is closed.
Figure 4:
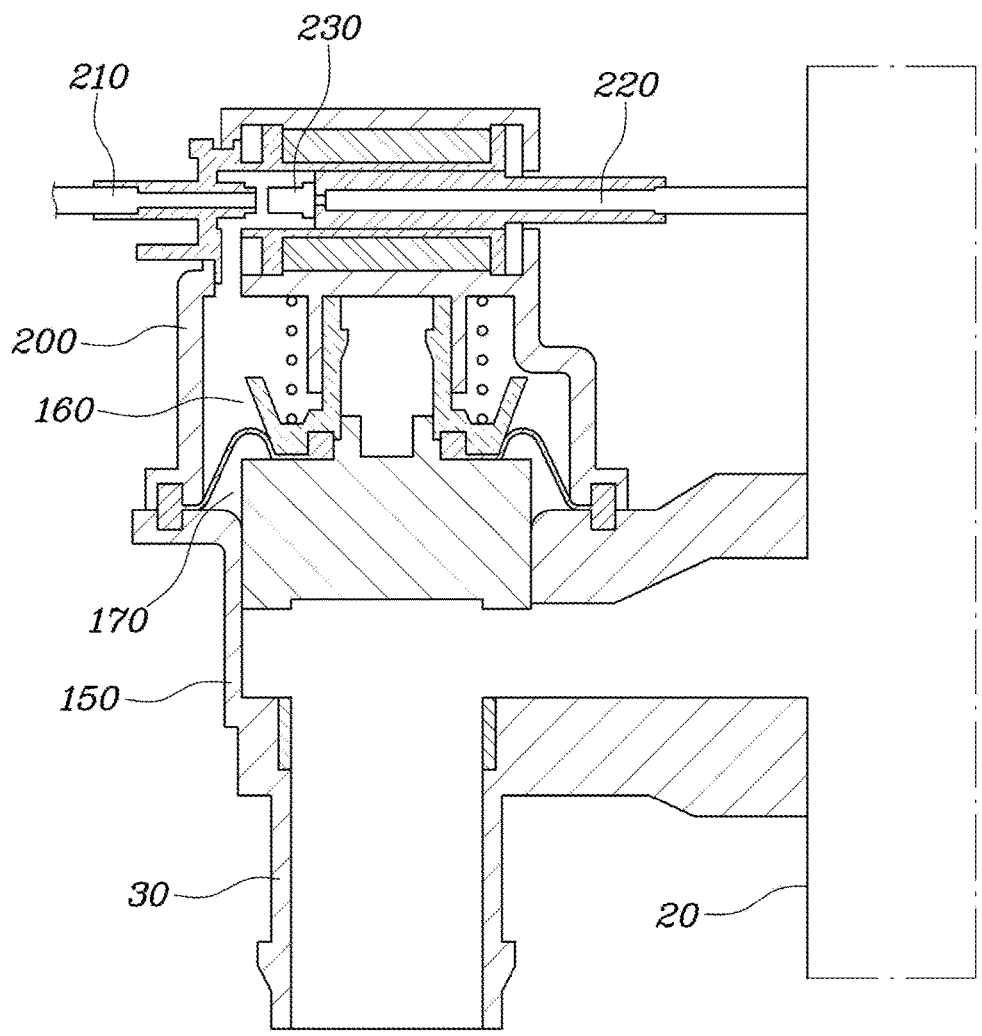
FIG. 4 is a view illustrating a state in which the valve device for a vehicle according to various embodiments of the present invention is opened.

As illustrated in FIGS. 2 to 4, a valve device for a vehicle 100 according to various embodiments of the present invention includes a pneumatic valve 150 having first and second chambers 160 and 170 in which respective pressures are regulated, and a pressure regulation valve 200 which is coupled to the pneumatic valve 150, communicates with the first chamber 160, has a positive pressure side opening 220 and a negative pressure side opening 210, and selectively opens and closes the positive and negative pressure side openings 220 and 210 to regulate the pressure in the first chamber 160.

Specifically, the pneumatic valve 150 includes the first and second chambers 160 and 170 in which the pressures are regulated.

According to various embodiments, the pneumatic valve 150 may be provided therein with a space in which a change in pressure occurs, and the space is partitioned into the first and second chambers 160 and 170. The plate for partitioning the first and second chambers 160 and 170 is provided in the form of a deformable diaphragm, and is deformed according to a pressure change in the first chamber 160 or the second chamber 170.

FIGS. 3 and 4 illustrate a state in which the inner portion of the pneumatic valve 150 is partitioned into the first and second chambers 160 and 170, by a diaphragm, and a valve body is coupled to the diaphragm so that the valve 150 is opened and closed while the valve body moves according to the deformation state of the diaphragm.

According to various embodiments, the second chamber 170 communicates with a fluid having a positive pressure to form the positive pressure, and the first chamber 160 communicates with a hose for forming a positive pressure and a hose connected to a vacuum tank for forming a negative pressure so as to form the positive and negative pressures.

According to various embodiments, the first chamber 160 is provided with an elastic part that provides an elastic force for pushing the diaphragm or the valve body toward the second chamber 170. FIGS. 3 and 4 schematically illustrate a state in which the elastic part in the first chamber 160 is provided as a coil spring.

Accordingly, when the first chamber 160 is filled with a positive pressure as illustrated in FIG. 3, a pressure difference between the first chamber 160 and the second chamber 170 is eliminated and the valve is closed by elasticity of the elastic part. Meanwhile, when the first chamber 160 is filled with a negative pressure as illustrated in FIG. 4, the diaphragm moves upward toward the first chamber 160 by a pressure difference between the first chamber 160 and the second chamber 170, and the valve is opened while the valve body moves toward the first chamber 160 by the deformation of the diaphragm.

Meanwhile, the pressure regulation valve 200 is coupled to the pneumatic valve 150, communicates with the first chamber 160, has the positive pressure side opening 220 and the negative pressure side opening 210, and selectively opens and closes the positive and negative pressure side openings 220 and 210 to regulate the pressure in the first chamber 160.

The pressure regulation valve 200 communicates with the first chamber 160 to regulate the pressure in the first chamber 160. Specifically, the pressure regulation valve 200 has the positive pressure side opening 220 connected to a positive pressure hose and the negative pressure side opening 210 connected to a negative pressure hose, and is coupled to the pneumatic valve 150 such that the inner space of the pressure regulation valve communicates with the first chamber 160. The pressure regulation valve 200 coupled to the pneumatic valve 150 is illustrated in FIG. 2.

In addition, when the pressure regulation valve 200 opens the positive pressure side opening 220 and closes the negative pressure side opening 210 as illustrated in FIG. 3, the first chamber 160 communicating with the pressure regulation valve 200 is formed with a positive pressure so that the pneumatic valve 150 is closed. When the pressure regulation valve 200 opens the negative pressure side opening 210 and closes the positive pressure side opening 220 as illustrated in FIG. 4, the first chamber 160 is filled with a negative pressure so that the pneumatic valve 150 is opened.

In a conventional pneumatic valve, positive and negative pressure hoses are connected to a first chamber in which a change in pressure occurs, and a valve for intermitting the transfer of negative pressure is provided on one point of the negative pressure hose. Accordingly, even when the valve on the negative pressure hose is opened, a time required to transfer a negative pressure to the pneumatic valve is delayed by the length of the negative pressure hose. For this reason, since the operating time of the valve is delayed when the valve needs to be operated, it is impossible to improve the response of the valve.

However, in various embodiments of the present invention, the pressure regulation valve 200 for controlling the change of pressure in the first chamber 160 is directly coupled to the first chamber 160 of the pneumatic valve 150, and is preferably provided to form a portion of the first chamber 160, as illustrated in FIGS. 2 to 4. Thus, when the pneumatic valve 150 is required to be opened and is filled with a negative pressure, the first chamber 160 may be filled with a negative pressure along with the operation of the pressure regulation valve 200. Therefore, the operability and response of the pneumatic valve 150 may be significantly improved.

Figure 1:
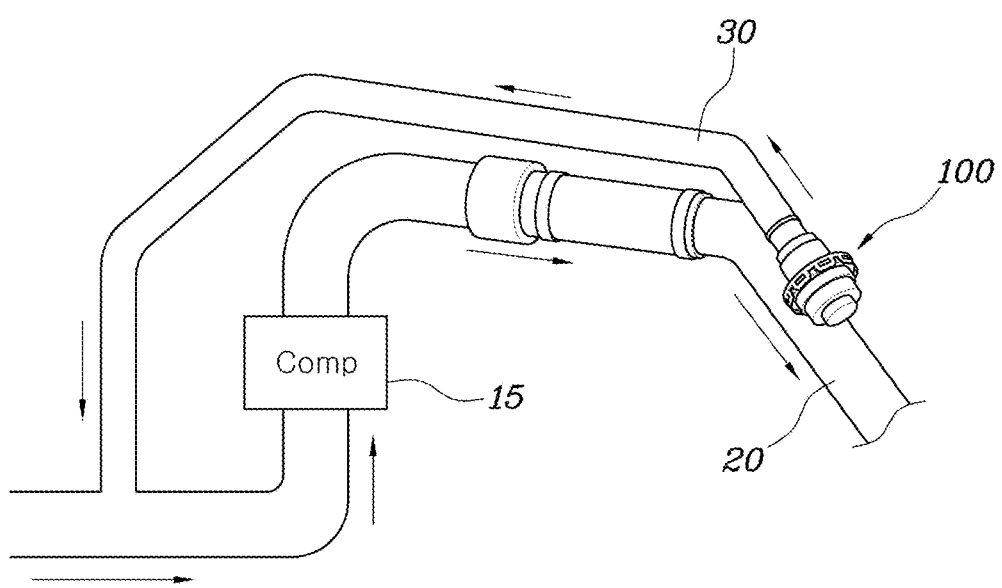
FIG. 1 is a view illustrating a state in which a valve device for a vehicle according to various embodiments of the present invention is mounted on a bypass passage from an intake passage connected to a compressor of a turbocharger.

Meanwhile, in the valve device for a vehicle 100 according to various embodiments of the present invention, the pneumatic valve 150 is mounted on a bypass passage 30 in which intake air is bypassed from the downstream side of a turbocharger to the upstream side thereof, and controls the flow of intake air, as illustrated in FIG. 1.

Specifically, the turbocharger may be provided on the passage of intake air flowing into an engine in order to improve the performance of the engine. An amount of intake air required in the engine is increased when a tip-in occurs in the vehicle, and the amount of intake air flowing into the engine via the turbocharger is thus increased.

However, when it is changed to a tip-out in the vehicle, the amount of intake air required in the engine is significantly decreased. Thus, the intake air compressed while passing through a compressor 15 of the turbocharger may flow backward to the upstream side of the compressor 15 of the turbocharger by a difference in pressure.

In this case, since the compressor 15 is rotating to compress intake air which still flows forward, an impact may be caused by intake air flowing backward. Accordingly, the bypass passage 30 may be provided on an intake passage 20 on which the turbocharger is mounted, so that supercharged air may be again bypassed upstream of the compressor 15 of the turbocharger through the bypass passage 30.

Meanwhile, the bypass passage 30 must be provided with a valve such that the valve may be closed to block the flow of intake air except when the back flow of intake air occurs, and may be opened when the back flow of intake air is expected according to tip-outs.

However, the valve provided on the bypass passage must be rapidly opened when the back flow of intake air is expected, so as to prevent an impact from occurring in the turbocharger or the intake passage 20. Therefore, it is particularly important to improve the response of the valve.

Thus, since the valve device for a vehicle 100 of the present invention, which is provided such that the pressure regulation valve 200 for regulating the pressure in the pneumatic valve 150 is directly coupled to the pneumatic valve 150 to be integrated therewith, is mounted on the bypass passage 30, it can exhibit an optimum effect.

That is, no gap is formed between the pneumatic valve 150 and the pressure regulation valve 200 of various embodiments of the present invention. Accordingly, when it is necessary to form a negative pressure, the first chamber 160 is immediately filled with the negative pressure without a delay time, and thus the pneumatic valve 150 is rapidly opened. Therefore, the pneumatic valve 150 may be used as a valve which is provided on the bypass passage to control the flow of air bypassing the turbocharger. FIG. 1 illustrates the state in which the valve device 100 for a vehicle according to various embodiments of the present invention is mounted on the bypass passage 30 for the turbocharger.

As a result, since the pneumatic valve 150 having improved response is mounted on the bypass passage in the various embodiments of the present invention, the pneumatic valve 150 may rapidly open the bypass passage 30 for the turbocharger in the tip-out state in order to effectively prevent an impact from occurring in the compressor 15 or the intake passage 20.

Meanwhile, as illustrated in FIGS. 3 and 4, in the valve device for a vehicle 100 according to various embodiments of the embodiment of the present invention, the pressure regulation valve 200 is used as a solenoid valve having an armature 230, the negative pressure side opening 210 is formed in one end of the movement path of the armature 230, and the positive pressure side opening 220 is formed in the other end thereof. Thus, when one of the negative pressure side opening 210 and the positive pressure side opening 220 is closed according to the movement of the armature 230, the other is opened to communicate with the first chamber 160.

Specifically, the pressure regulation valve 200 is a solenoid valve. The solenoid valve has the armature 230 surrounded by solenoids, and the armature 230 is linearly moved along the movement path thereof in response to operating signals.

Preferably, the pressure regulation valve 200, which is integrally coupled to the first chamber 160 of the pneumatic valve 150, is provided such that both ends of the linear path of the armature 230 communicate with the first chamber 160. In addition, the negative pressure side opening 210 connected with the negative pressure hose is formed in one end of the linear path of the armature 230, and the positive pressure side opening 220 connected with the positive pressure hose is formed in the other end thereof.

The relationship of operation of the pressure regulation valve 200 and the pneumatic valve 150 will be described below with reference to FIGS. 3 and 4.

First, FIGS. 3 and 4 illustrate the state in which the pressure regulation valve 200 is coupled to the upper portion of the first chamber 160 of the pneumatic valve 150. FIG. 3 illustrates the state in which the armature 230 of the pressure regulation valve 200 is moved to the other end of the movement path thereof so that the negative pressure side opening 210 is closed and the positive pressure side opening 220 formed in one end thereof is opened so as to form a positive pressure in the first chamber 160.

FIG. 4 illustrates the state in which the armature 230 is moved to one end of the movement path thereof so that the positive pressure side opening 220 is closed. In this case, the negative pressure side opening 210 is opened and communicates with the first chamber 160 so as to form a negative pressure in the first chamber 160. Accordingly, a pressure difference is formed between the first chamber 160 and the second chamber 170, and the valve body is thus moved upward toward the first chamber 160, thereby opening the pneumatic valve 150.

As a result, in various embodiments of the present invention, the pressure regulation valve 200 is used as a solenoid valve, one of the positive pressure side opening 220 and the negative pressure side opening 210 is closed and the other is opened according to the movement of the armature 230. Consequently, the pressure regulation valve 200 regulates the pressure in the first chamber 160 of the pneumatic valve 150 to adjust the opening and closing of the pneumatic valve 150. The pressure regulation valve 200 may adjust the opening and closing of the pneumatic valve 150 by controlling current signals applied to the pressure regulation valve 200 through a separate controller.

Meanwhile, in the valve device for a vehicle 100 according to various embodiments of the present invention, the pressure regulation valve 200 is detachably coupled to the pneumatic valve 150, as illustrated in FIG. 2.

Specifically, in various embodiments of the present invention, the positive and negative pressure hoses are connected to the pressure regulation valve 200, the pressure regulation valve 200 may be attachably and detachably provided so as to be decoupled from the pneumatic valve 150 and replaced if necessary.

That is, since the pressure regulation valve 200 is attachably and detachably provided in various embodiments of the present invention, it is possible to improve durability by easily replacing the pressure regulation valve 200 when it fails. FIG. 2 illustrates the state in which the pressure regulation valve 200 is coupled to the first chamber 160 of the pneumatic valve 150 in a protrusion insertion manner, and is easily decoupled therefrom if necessary.

Meanwhile, in the valve device for a vehicle 100 according to various embodiments of the present invention, the pneumatic valve 150 has a plurality of insertion grooves 190 which is circumferentially arranged on the outer periphery thereof, and the pressure regulation valve 200 has a plurality of insertion protrusions 240 formed at positions corresponding to the insertion grooves 190, as illustrated in FIG. 2. Thus, the pressure regulation valve 200 is mounted to the pneumatic valve 150 in a state in which it is rotated relative to the pneumatic valve 150.

Specifically, the insertion grooves 190 are formed on the outer periphery of the pneumatic valve 150, as illustrated in FIG. 2. The insertion grooves 190 are circumferentially arranged as the divided pieces of a sleeve protruding from the outside of the pneumatic valve 150.

Meanwhile, the pressure regulation valve 200 has the insertion protrusions 240 formed at positions at which it is coupled to the pneumatic valve 150. Each of the insertion protrusions 240 is provided to have a shape corresponding to the shape of the associated insertion groove 190.

Accordingly, the insertion protrusions 240 are fixedly inserted into the insertion grooves 190 when the pressure regulation valve 200 is coupled to the pneumatic valve 150, and the pressure regulation valve 200 is thus integrated with the pneumatic valve 150.

Meanwhile, since the insertion grooves 190 of the pneumatic valve 150 and the insertion protrusions 250 of the pressure regulation valve 200 are circumferentially arranged as described above, the pressure regulation valve 200 may be coupled to the pneumatic valve 150 while rotating relative to the pneumatic valve 150.

As described above, the valve device for a vehicle 100 may be provided in a space in which the intake passage 20 of the engine is placed in various embodiments of the present invention. Since a variety of devices are provided in the space, it is important to properly set the space in consideration of space utilization.

Meanwhile, the negative and positive pressure hoses are connected to the pressure regulation valve 200 in various embodiments of the present invention. Therefore, in terms of space utilization, it is important to determine the layout of the valve according to the mounting position of the valve in consideration of the connection structure.

That is, the pressure regulation valve 200 connected with the positive and negative pressure hoses is preferably coupled to the pneumatic valve 150 in the state in which it rotates relative to the pneumatic valve 150 in various embodiments of the present invention. Therefore, it is possible to improve space utilization by properly rotating the pressure regulation valve 200 and coupling it to the pneumatic valve 150 in consideration of an allowable space that is changeable according to the mounting position of the pneumatic valve 150.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve device for a vehicle, comprising:
a pneumatic valve having first and second chambers in which respective pressures thereof are regulated; and
a pressure regulation valve coupled to the pneumatic valve, the pressure regulation valve fluidically communicating with the first chamber, including a positive pressure side opening and a negative pressure side opening, and selectively opening and closing the positive pressure side opening and the negative pressure side opening to regulate the pressure in the first chamber,
wherein the pneumatic valve includes a plurality of insertion grooves circumferentially arranged on an outer periphery thereof; and
wherein the pressure regulation valve includes a plurality of insertion protrusions formed at positions corresponding to the insertion grooves, so that the pressure regulation valve is mounted to the pneumatic valve in a state in which the pressure regulation valve is rotated relative to the pneumatic valve.

2. The valve device according to claim 1, wherein the pneumatic valve is mounted on a bypass passage in which intake air is configured to be bypassed from a downstream side of a turbocharger to an upstream side of the turbocharger, to control flow of the intake air.

3. The valve device according to claim 1, wherein the pressure regulation valve comprises a solenoid valve having an armature, the negative pressure side opening is formed on a first end of a movement path of the armature, and the positive pressure side opening is formed on a second end of the movement path of the armature, to open one of the negative pressure side opening and the positive pressure side opening to fluidically communicate with the first chamber, when another of the negative pressure side opening and the positive pressure side opening is closed according to movement of the armature.

4. The valve device according to claim 1, wherein the pressure regulation valve is detachably coupled to the pneumatic valve.

* * * * *